United States Patent [19]
Keefe

[11] Patent Number: 5,803,409
[45] Date of Patent: Sep. 8, 1998

[54] METHOD AND APPARATUS FOR REDUCING THE DRAG OF FLOWS OVER SURFACES

[75] Inventor: Laurence R. Keefe, Mountain View, Calif.

[73] Assignee: Nielsen Engineering & Research, Inc., Mountain View, Calif.

[21] Appl. No.: 659,306

[22] Filed: Jun. 6, 1996

[51] Int. Cl.⁶ .................................................. B64C 23/02
[52] U.S. Cl. ......................... 244/206; 244/130; 244/204; 244/201
[58] Field of Search ................... 244/206, 207, 244/208, 209, 130, 204, 201, 200, 198, 12.1, 73.3

[56] References Cited

U.S. PATENT DOCUMENTS

| | | | |
|---|---|---|---|
| 1,580,577 | 4/1926 | Baumann | 244/207 |
| 1,829,616 | 10/1931 | Stalker | 244/208 |
| 2,478,726 | 8/1949 | Trey | 244/207 |
| 3,194,518 | 7/1965 | Walsh | 244/207 |
| 3,362,663 | 1/1968 | Wehrmann . | |
| 4,202,518 | 5/1980 | Burnham et al. . | |
| 4,516,747 | 5/1985 | Lurz . | |
| 4,664,345 | 5/1987 | Lurz | 244/208 |
| 4,671,474 | 6/1987 | Haslund . | |
| 4,836,473 | 6/1989 | Aulehla et al. . | |
| 5,069,402 | 12/1991 | Wortman . | |
| 5,100,085 | 3/1992 | Rubbert . | |
| 5,156,362 | 10/1992 | Leon . | |
| 5,180,119 | 1/1993 | Picard . | |
| 5,195,702 | 3/1993 | Malvestuto, Jr. . | |
| 5,209,438 | 5/1993 | Wygnanski . | |
| 5,255,881 | 10/1993 | Rao . | |
| 5,263,667 | 11/1993 | Horstman | 244/209 |
| 5,297,764 | 3/1994 | Haney . | |
| 5,365,490 | 11/1994 | Katz . | |
| 5,437,421 | 8/1995 | Nosenchuck et al. . | |
| 5,457,630 | 10/1995 | Palmer . | |

*Primary Examiner*—Robert J. Oberleitner
*Assistant Examiner*—Tien Dinh
*Attorney, Agent, or Firm*—James Creighton Wray; Meera P. Narasimhan

[57] ABSTRACT

An apparatus, and its accompanying method, for reducing the drag of flows over a surface includes arrays of small disks and sensors. The arrays are embedded in the surface and may extend above, or be depressed below, the surface, provided they remain hydraulically smooth either when operating or when inactive. The disks are arranged in arrays of various shapes, and spaced according to the cruising speed of the vehicle on which the arrays are installed. For drag reduction at speeds of the order of 30 meters/second, preferred embodiments include disks that are 0.2 millimeter in diameter and spaced 0.4 millimeter apart. For drag reduction at speeds of the order of 300 meters/second, preferred embodiments include disks that are 0.045 millimeter in diameter and spaced 0.09 millimeter apart. Smaller and larger dimensions for diameter and spacing are also possible. The disks rotate in the plane of the surface, with their rotation axis substantially perpendicular to the surface. The rotating disks produce velocity perturbations parallel to the surface in the overlying boundary layer. The sensors sense the flow at the surface and connect to control circuitry that adjusts the rotation rates and duty cycles of the disks accordingly. Suction and blowing holes can be interspersed among, or made coaxial with, the disks for creating general three-component velocity perturbations in the near-surface region. The surface can be a flat, planar surface or a nonplanar surface, such as a triangular riblet surface. The present apparatus and method have potential applications in the field of aeronautics for improving performance and efficiency of commercial and military aircraft, and in other industries where drag is an obstacle, including gas and oil delivery through long-haul pipelines.

19 Claims, 7 Drawing Sheets

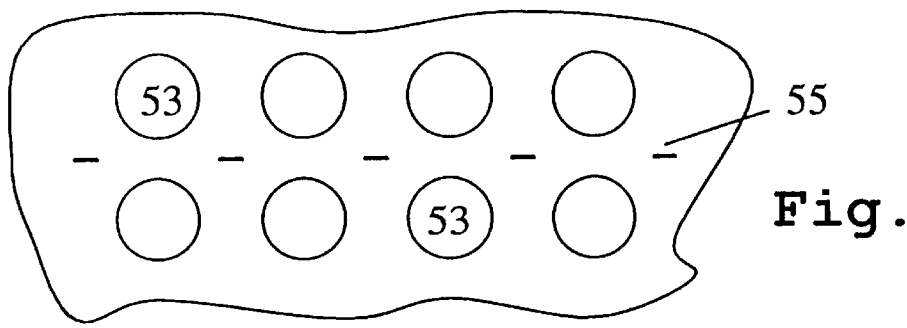
Fig. 2a
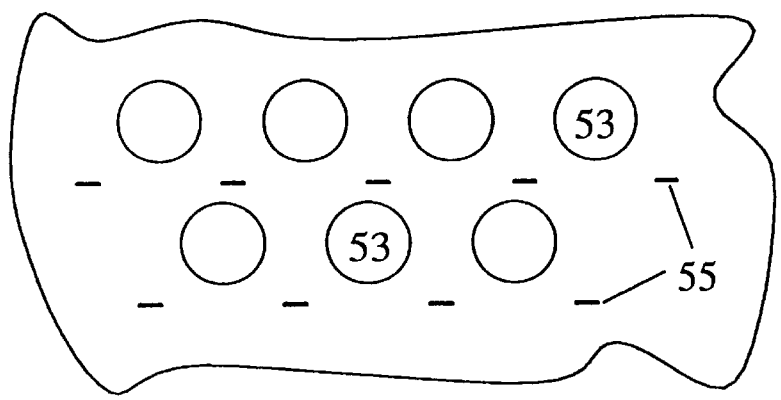
Fig. 2b
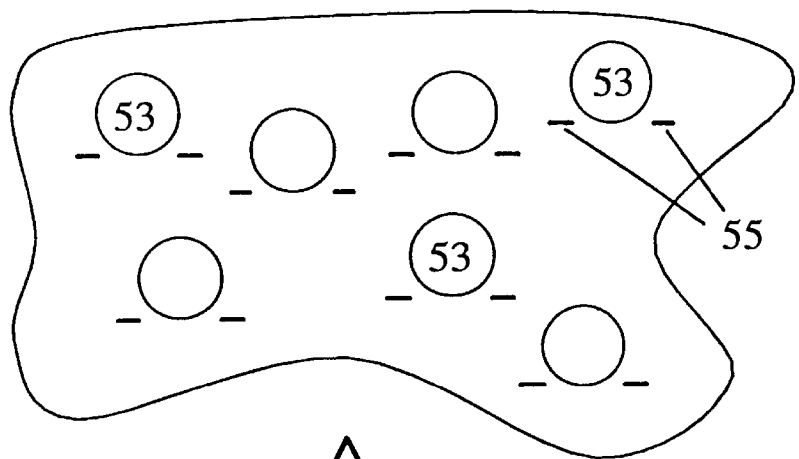
Fig. 2c
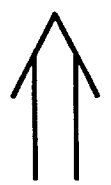
Flow

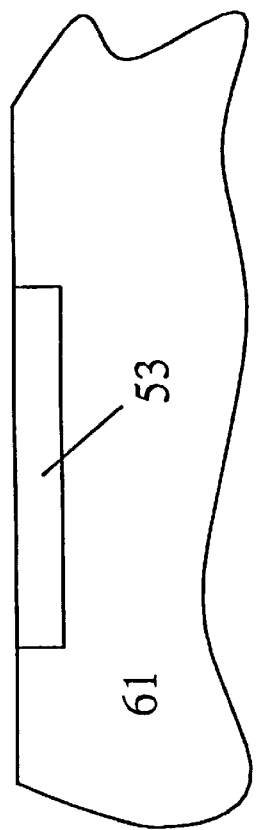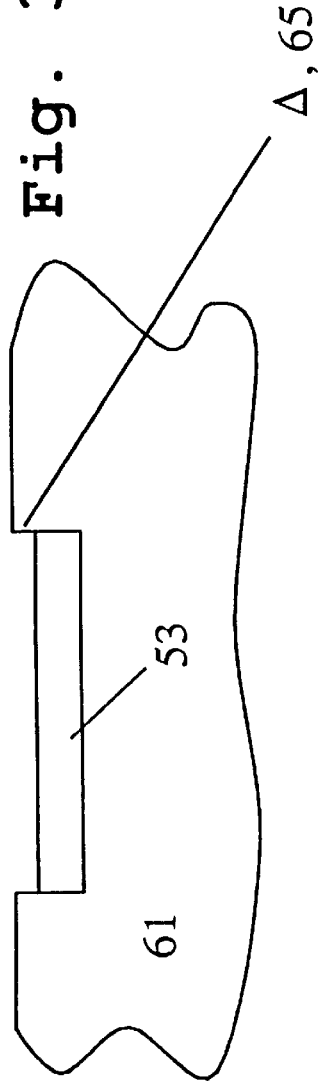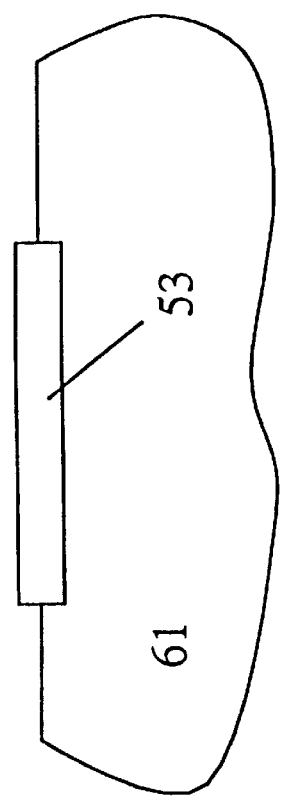

METHOD AND APPARATUS FOR REDUCING THE DRAG OF FLOWS OVER SURFACES

This invention was made with Government support under NAS1-19643 awarded by NASA and under F33615-94-C-3004 awarded by the Air Force. The Government has certain rights in this invention.

BACKGROUND OF THE INVENTION

This invention relates generally to the field of aeronautics, and specifically to methods and apparatus for flow control over surfaces. Its primary application is to drag reduction and separation control, but it may also be used for drag increase and surface heat transfer modification.

Worldwide, commercial airlines spend hundreds of millions of dollars each year on fuel. Therefore, small decreases in fuel consumption result in large savings for the airlines. Since airlines generally make aircraft purchasing decisions based partly on operating costs, airframe manufacturers increase sales by limiting drag and other factors that increase fuel consumption. Drag reduction ideas also find application in the petro-chemical industries. There the energy expended to pump petroleum products long distances goes, almost entirely, to overcoming friction drag on a pipeline's internal surface. Consumers ultimately bear the brunt of that energy expenditure in the form of higher prices. Attempts at flow control for drag reduction began more than fifty years ago. Several ideas have yielded net drag reductions, but none has survived the test of mechanical simplicity and operational durability needed to make an aircraft, or pipeline, so-equipped profitable to manufacture or operate.

At the beginning of World War II, drag reducing devices were created that comprised arrays of strings positioned transverse to the boundary layer and parallel to the underlying surface. At the same time, natural laminar flow airfoils were under development. Those efforts proved unsuccessful due to unit Reynolds number effects and the effects of cross-flow instability on swept wings. In the early 1960's laminar flow control using area suction was developed, but the drag reduction obtained was insufficient to balance the energy expended or justify the mechanical complexity and cost of the installation within an airplane's wing. The energy crisis of the early 1970's revived interest in laminar flow controls and spawned numerous other drag reduction ideas. Studies of flying and swimming animals suggested the use of polymer additives, compliant walls, and textured surfaces to reduce drag. Large eddy breakup devices and riblet structures also made their appearance during this time. Riblets did reduce drag, but the materials used to manufacture them deteriorated rapidly in service, and ultimately caused a net increase in drag. Work continues today on both textured surfaces and riblet variants. The earlier laminar flow control work has developed into the hybrid laminar flow concept, in which area suction is applied over the first 10-20% of the chord, with natural laminar flow being maintained over the remainder of the chord by airfoil section choice and high quality surface finishing. This concept displays net drag reduction, but its structural complexity raises the cost of an aircraft to the point that additional competitive pressures will be needed to make its purchase profitable to the airlines.

These developments have all centered on essentially passive, or nonadaptive, flow control. Their control inputs, if any, are determined from the mean flow. As a result, the drag reduction benefits they produce are modest; the most successful concepts, riblets and hybrid laminar flow, yield skin friction reductions of less than 10. However, skin friction along an aircraft's surface decreases much more substantially when the boundary layer is subjected to active control at scales commensurate with the underlying turbulent structure. Computer simulations suggest that 50-60% reductions are theoretically possible by such action. The idea of active control is not new, but the ability to easily fabricate actuators at the appropriate scales is. Not unnaturally, in many active control methods the actuator designs and control algorithms are specifically tailored to interfere with the near-wall bursting process. Bursting is the fundamental cycle of fluid dynamical events by which turbulence at a surface is maintained, energy is extracted from the mean flow above it, and drag is produced. Because of their specific tie to bursting, such methods and designs are not readily adaptable to other fluid control goals, such as separation control, drag increase, and surface heat transfer modification. Nor can these actuators be readily combined with others to generate general three-dimensional control of the near-wall velocity field.

OBJECTS AND ADVANTAGES

Accordingly, several objects and advantages of the present invention are:

(a) to provide a surface-mounted, fluid actuator that exerts control of the boundary layer above it by spinning a coplanar disk or rotor to generate vorticity normal to the surface.

(b) to provide a surface-mounted, spinning-disk, fluid actuator for drag reduction and separation control whose size can easily be made commensurate with the underlying structure of the turbulent boundary layer over the body in which the actuator is installed.

(c) to provide a surface-mounted, spinning-disk, fluid actuator that is hydraulically smooth, and does not require deformation of the surface either when operating or when inactive.

(d) to provide a surface-mounted, spinning-disk, fluid actuator that can implement general boundary layer control schemes in addition to those tailored specifically to interfering with the turbulent bursting process.

(e) to provide representative illustrations of the spinning-disk actuators' use for drag reduction schemes unrelated to interfering with the bursting process.

(f) to provide a surface-mounted, spinning-disk, fluid actuator that, when combined with blowing and suction, develops a general three-dimensional control of the near-wall flow that currently cannot be provided by other actuator combinations.

SUMMARY OF THE INVENTION

A flow control device for drag reduction and separation control includes hydraulically smooth surface-mounted actuators that generate normal vorticity at the surface by rotary motion of disks or rotors. The device produces useful spanwise and streamwise control velocities out to five or six viscous length scales above the surface, and yields a 35% turbulent skin friction reduction. Normally directed jets, both inflow and outflow, are included in a separate embodiment of the present invention to provide a third component of control velocity. This embodiment is appropriate for implementation of more general fluid control goals in addition to drag reduction; these include, but are not limited to, drag increase, enhanced mixing, and surface heat transfer modification.

The present invention uses arrays of rotating, coplanar disks as flow actuators. The arrays are embedded in, or mounted on, a surface underlying the flow, do not require deformation of that surface, and may intrude into the flow, either when operating or when inactive, to the extent that they remain hydraulically smooth. Manufacture of the disks by micromachining techniques (low pressure chemical vapor deposition, photolithography and chemical etching) currently yields actuators with the necessary thinness. Other fabrication techniques will undoubtedly serve this purpose. Effective as drag reduction apparatus on their own, the arrays of disks, when combined with suction and blowing (inflow and outflow jets), demonstrate a general three-component control capability that is not realized by existing flow control systems. The present invention has drag reduction as its primary application, but when included in aeronautical applications, provides for improved separation control that may lead to lift enhancement. The apparatus and method have further applications for facilitating oil and gas delivery through pipelines.

The fundamental notion underlying the present invention is to use circular disks or rotors embedded in, and rotating coplanar with, a surface to produce velocity perturbations parallel to the surface in the overlying boundary layer. The disks rotate in the plane of the surface, and thus have rotation axes that are perpendicular to the surface. The resulting velocity perturbations have the effect of reducing or increasing drag and delaying or enhancing separation, depending on the rotation rates and duty cycle of the disk actuators. The actuators are connected to a control system that determines the appropriate rotation rates and cycle by sensing the flow near the surface. Since the actuators remain hydraulically smooth while operating, they are less prone to damage than other flow control devices, such as miniature vortex generators, that must be deployed into the flow to be effective.

The rotating disks activate and control the normal component of vorticity in the near-surface flow. That activation and control presents new and unique possibilities for flow control that are unavailable using existing control apparatus. Several drag reduction ideas may be implemented using disk actuators alone. However, in addition, combining the rotating disks, which control normal vorticity, with blowing and suction jets, which control normal velocity, provides a system for complete control of all three components of velocity in the near-surface region.

True active control of surface boundary layers, such as aircraft boundary layers, can only occur at the submillimeter scales commensurate with the underlying turbulent structure. The emergence of micro-electromechanical systems technology has made convenient fabrication of actuators of the correct scale possible. The rotating disk actuator described here is best typified at the present time by devices called "salient-pole micromotors" that have been manufactured using this technology. Yet, it should be clear that their fluid control capability, namely the generation of normal vorticity, is independent of the method used to fabricate them. Thus, it is to be expected that additional fabrication methods will emerge that allow manufacture of hydraulically smooth disk actuators of the appropriate diameter, without reference to what is presently called micro-electromechanical systems technology.

Surface arrays of disks will generate a velocity field that is parallel to that surface. Numerical simulations of turbulent flow above such a surface indicate that these parallel velocity fields can reduce skin friction drag by 35–50%, depending on the dynamic pattern of the velocity field produced by specifying the normal vorticity at the surface. The disk actuators provide the mechanism to produce the desired vorticity.

The theoretical basis for believing that addition of suction and blowing to disk arrays will produce a system capable of general, three-dimensional fluid control is the interdependence of the three velocity components required by the incompressibility constraint. Despite the high transonic, low supersonic Mach numbers flown by commercial transports and many Air Force aircraft, substantial evidence indicates that compressibility effects on turbulent boundary layer dynamics are unimportant at those speeds. That means only two velocity components in an aircraft's boundary layer are independent. Because of that relation, and a similar one for the vorticity, there are only two independently specifiable components, of either velocity or vorticity, in incompressible flow, and one is at liberty to choose which two characterize the flow. That implies that control may similarly be confined to two flow components, the third following by virtue of incompressibility.

A common practice in wall-bounded shear flows is to choose the wall normal velocity, $v$, and the wall normal vorticity, $\eta$, as the two independent quantities. The wall normal velocity, $v$, is the quantity traditionally used for control via suction and blowing, but the notion of using normal vorticity is new. The development of surface micromotors means that the normal vorticity is now directly accessible at the wall. The mathematical definition of vorticity, as the curl of the velocity field, has the physical interpretation that it equals twice the local angular velocity of the fluid. Given the no-slip condition, angular velocity of a surface element, which in the present invention is illustrated as a rotating micromotor, induces angular velocity, or normal vorticity, in the near-wall fluid. Combining a micromotor with a traditional normal jet produces a two component control signal that, by incompressibility, completely specifies the near-wall flow fluid. The actuation scheme of the present invention does not presuppose any phenomenological model of near-wall turbulent flow, and is thus more general in its application than those schemes that extend microscopic flaps and bumps into the flow to produce longitudinal vorticity that interferes with the near-wall bursting process.

Preferred embodiments of the present apparatus include arrays of disks and sensors distributed over a surface. For aeronautical applications, the surface is preferably an airfoil, but may also be the fuselage, engine nacelles, or internal components of the propulsion system. The disks are preferably locally controlled, either in groups or individually. The size of the disks and their center-to-center spacing are dependent on situational requirements and need not be uniform or regular. For aircraft applications the size and spacing of the disks on the wings or fuselage are dependent on the cruising speed of the aircraft on which the disks are installed. This size and spacing may vary across the surface of the aircraft. Generally, the local values of size and spacing on a surface will depend upon the characteristics of the boundary layer above the surface, and the mean velocity at the upper edge of the boundary layer.

In an additional preferred embodiment of the present invention, holes for blowing and suction are interspersed among, or coaxial with, the disks. The addition of suction and blowing to the velocity perturbations generated by the rotating disks creates a nonintrusive fluid actuation system capable of producing general three-component velocity perturbations in the near-surface region. The arrays are functional whether distributed on a planar or a nonplanar surface.

In one embodiment, the arrays are placed on the face of triangular riblets already installed on an airplane wing's surface.

Numerous benefits and applications are realized by the present invention. The benefits of surface friction reduction for an aircraft include increased range and performance for military aircraft and increased profitability for commercial transports. Aside from making the aircraft more fuel efficient, the decreased fuel consumption also translates into lower pollutant levels. Additionally, the present invention is not limited to simply drag reduction. By producing three-component velocity signals, the present invention has applications for separation control and for increasing turbulence levels to enhance heat transfer.

Outside the sphere of aircraft operations, the drag reduction and separation control provided by the present invention enhances the performance of surface and subsurface naval vessels. An extremely attractive nonaeronautical, commercial application of the present invention is as a boundary layer device in pipelines for reducing friction drag during long-distance oil and gas transport.

An apparatus for actively controlling a boundary layer over a surface includes at least one actuator positioned in the surface. The actuator typically consists of a stationary part and a rotating part. The rotating part rotates in the plane of the surface and has an axis of rotation that is substantially perpendicular to the surface. The stationary part consists of a drive mechanism that provides the motive force which rotates the rotating part. Such motive force may be electrostatic, electromagnetic, pneumatic, thermal, or mechanical in nature; it may be derived from impulsive impacts on the rotating part; it may be applied indirectly and transmitted to the rotating part by mechanical linkages or gears. The actuator may be completely embedded in the surface or may project above, or be depressed below, the surface, but only to the extent that it remains hydraulically smooth. The rotating part is preferably a circular disk or rotor.

Sensors are positioned in the surface and connected to a control system for sensing flow generated at the surface and for adjusting rotation rates and cycles of the actuators. Single sensors may provide input for control of an individual actuator, or may be used for control of groups of actuators. In one embodiment of the invention multiple holes are positioned in the surface and interspersed among, or are coaxial with, the actuators. These holes allow for controlling the velocity normal to the surface in the overlying boundary layer by blowing and suction.

A method for actively controlling a boundary layer over a surface includes the steps of embedding actuators having rotors in a surface, rotating the rotors of each actuator, and generating normal vorticity at the surface through the rotating of the rotors. In further embodiments the method includes blowing air outward or suctioning air inward by jets directed substantially normal to the surface, for adding a normal component of velocity to the normal vorticity generated by the rotating of the rotors.

The method further includes the steps of sensing the normal vorticity generated by the rotating of the rotors, comparing a sensed vorticity with a desired vorticity value and adjusting rotation of the rotors.

These and further and other objects and features of the invention are apparent in the disclosure, which includes the above and ongoing written specification, with the claims and the drawings.

BRIEF DESCRIPTION OF THE DRAWINGS

FIGS. 2a, 2b, and 2c show alternative configurations of arrays of the actuators of FIG. 1.

FIG. 3a, 3b, and 3c show preferred and alternative installations of the arrays of actuators that preserve their hydraulic smoothness.

DETAILED DESCRIPTION OF THE PREFERRED EMBODIMENTS

Figure 1:
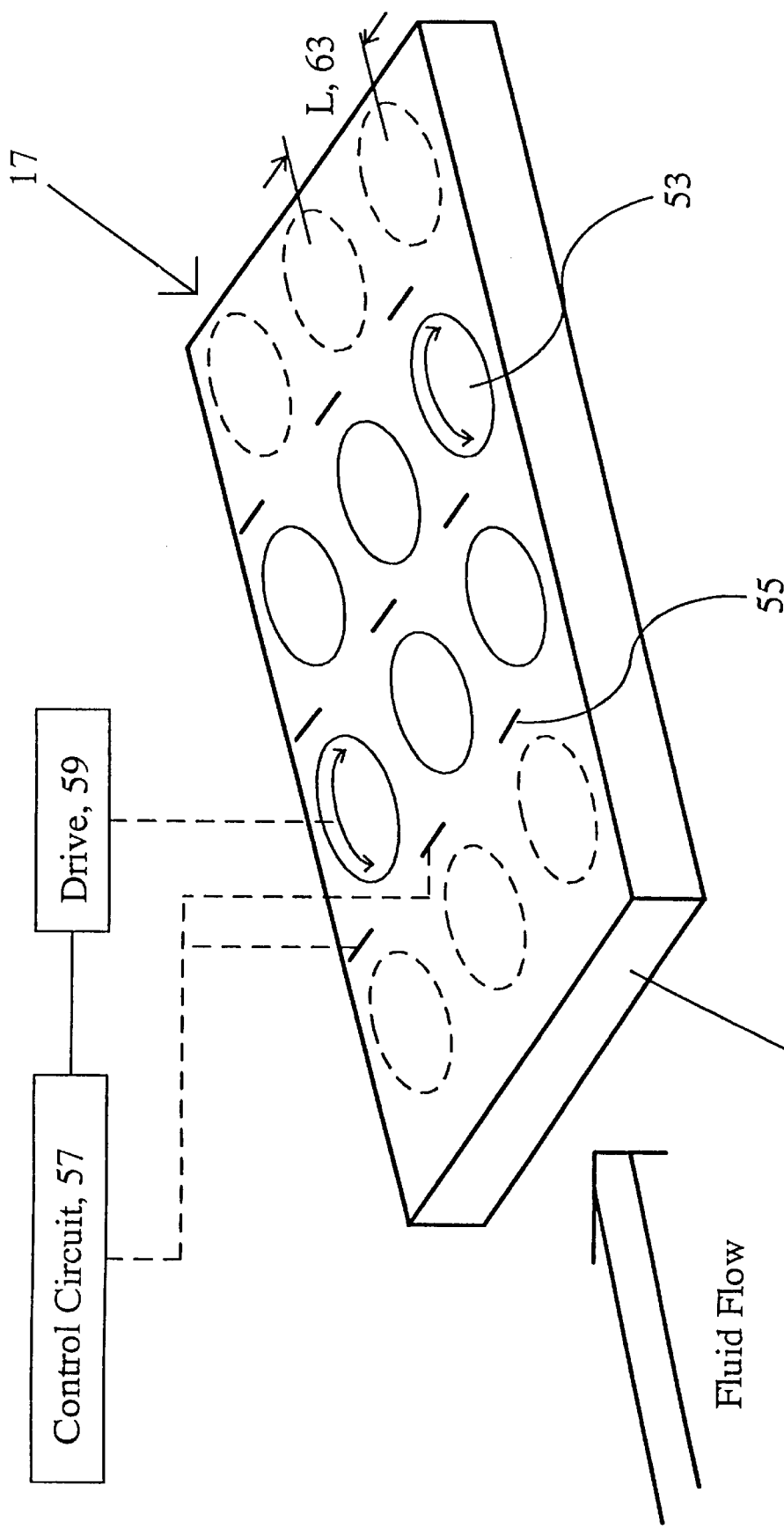
FIG. 1 shows an array of normal vorticity actuators of the present invention with accompanying flow sensors.

Referring to FIG. 1, an apparatus 17 for actively controlling a boundary layer over a surface includes actuator disks 53 positioned in a surface 61. Each actuator includes a stationary drive mechanism 59 and a rotating part 53. Rotating part 53 is preferably a circular disk that rotates in the plane of the surface. Rotating part 53 has an axis of rotation that is substantially perpendicular to the surface. The size and spacing of actuator disks 53 vary according to situational requirements. If $\tau_{xy}$ is the mean shear stress exerted by the uncontrolled flow above surface 61, $\rho$ is the density of the fluid, and $\nu$ the fluid's coefficient of kinematic viscosity, the wall friction velocity $u_\tau$ is defined by $$u_\tau = \sqrt{\frac{\tau_{xy}}{\rho}}$$

In preferred embodiments of actuators for drag reduction, the spacing L 63 between disk actuators 53 should satisfy the relation $$L < 33 \frac{\nu}{u_\tau}$$

The diameter of actuator disks 53 should be as large a fraction of this spacing as is consistent with ease of fabrication of the actuator arrays. In preferred embodiments for drag reduction at speeds of the order of 30 meter/second, the spacing L 63 between disks should be 0.4 millimeter with a disk diameter of 0.2 millimeter. In preferred embodiments for drag reduction at speeds of the order of 300 meter/second at 10 kilometers altitude, the disk spacing L 63 should be 0.09 millimeter, and the disk diameter 0.045 millimeter.

In preferred embodiments of the present invention, sensors 55 are positioned in surface 61 for sensing flow generated at the surface, and connected to control circuitry 57 that adjusts the rotation rates and cycles of the at least one actuator by commanding its drive 59. Typically control circuitry 57 samples sensor outputs on either side of disk 53 when determining the rate and duty cycle of rotation to be produced by drive 59.

Referring to FIG. 2a, FIG. 2b, and FIG. 2c, actuator disks 53 may be arrayed in any pattern appropriate for the flow control effect desired. Such arrays may be ordered or disordered. They may be on regular grids, as in FIG. 2a or FIG. 2b, or may be sited without regard for regularity, as in FIG. 2c. In preferred embodiments to achieve drag reduction, the arrays are regular. Preferably each actuator disk 53 has two flow sensors 55 situated in its neighborhood.

Referring to FIG. 3a, actuator disks 53 are preferably mounted flush with surface 61. However, referring to FIG.

3b and FIG. 3c, actuator disks 53 may be depressed below surface 61, as in FIG. 3b, or extended above surface 61, as in FIG. 3c, a distance Δ 65 that still leaves them hydraulically smooth. Distance Δ 65 should satisfy the relation $$\Delta < 5 \frac{\nu}{u_\tau}$$

for actuator disk 53 to be considered hydraulically smooth. In preferred embodiments, distance Δ 65 is reduced to less than half this value, to account for the possibility that actuator disks 53 in an array may be both extended above and depressed below surface 61.

Figure 4:
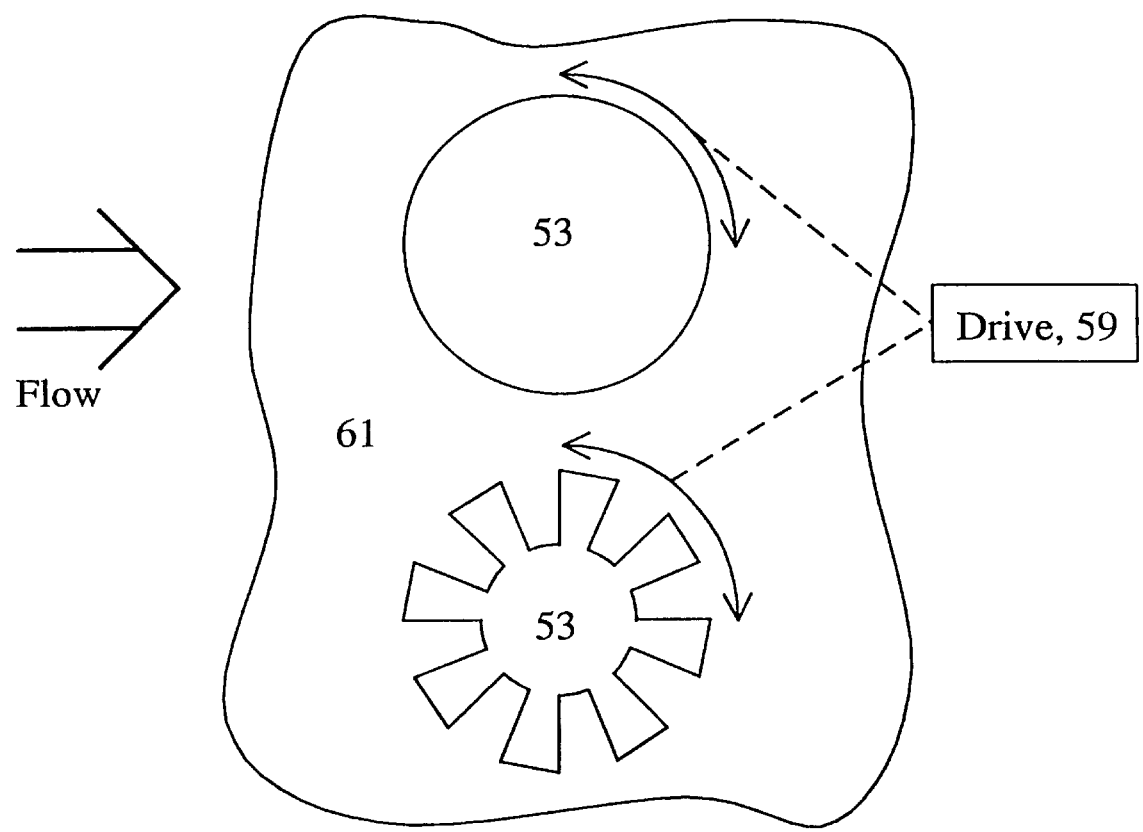
FIG. 4 shows two possible shapes for the rotating part of the actuator.

Referring to FIG. 4, in preferred embodiments, rotating part 53 of the actuator is a solid disk or rotor. Solid disks are likely to be the most effective generators of normal vorticity because of their greater surface area, but rotors may be easier to drive. The choice will depend upon available drive mechanisms and the relative amount of energy needed to produce the desired normal vorticity.

Figure 5:
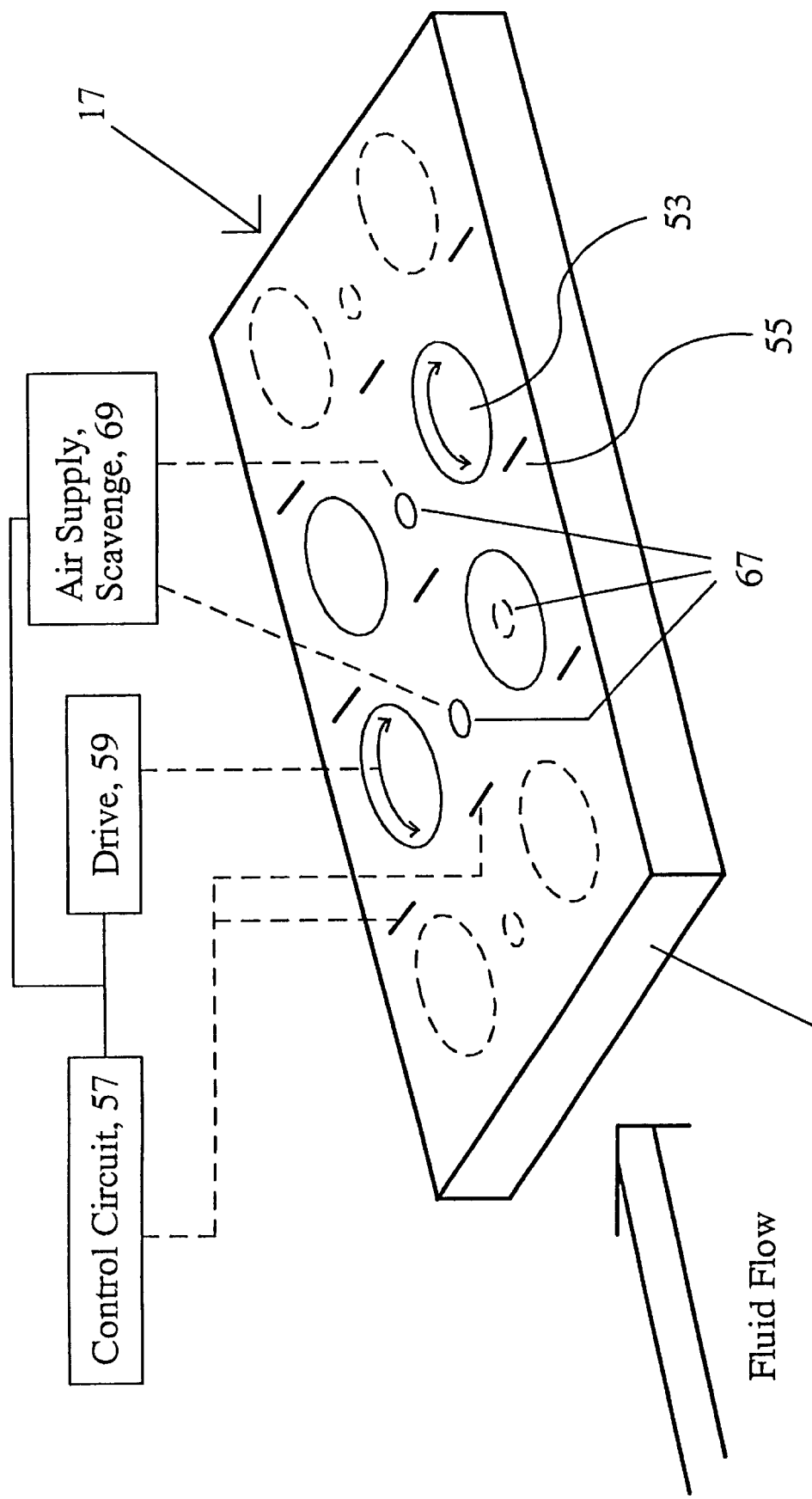
FIG. 5 shows an array of normal vorticity actuators of the present invention with accompanying flow sensors and interspersed holes for blowing and suction.

In further preferred embodiments of the present invention, and referring to FIG. 5, holes 67 will be interspersed between actuator disks 53 or coaxial with them. Such holes 67 will be connected to air supply and scavenging apparatus 69 to allow for control of the normal velocity above the surface by blowing and suction, in addition to the control of normal vorticity provided by actuator disks 53.

The theoretical basis for the present invention is the interdependence of the three velocity components required by the incompressibility constraint. Morkovin's hypothesis states that density fluctuations are unimportant in the dynamics of turbulent boundary layers with moderate supersonic edge Mach numbers ($M_e<3$). Therefore an incompressible Navier-Stokes equation is applicable for describing and controlling those flows. The incompressibility constraint, $$\partial u/\partial x + \partial v/\partial y + \partial w/\partial z = 0$$

means that only two of the three velocity components are independent. A similar relation holds for components of the vorticity $\omega=(\xi,\eta,\zeta)$. With the additional assumption that the velocity v and vorticity ω vectors are decomposed as $$\vec{v}(x,y,z,t) = U(y)\hat{i} + \epsilon \vec{v}(x,y,z,t) \quad \vec{v}=(u,v,w)$$

$$\vec{\omega}(x,y,z,t) = \Omega(y)\hat{k} + \epsilon \vec{\omega}(x,y,z,t)$$

the Navier-Stokes equation can be written as $$\left\{ \frac{\partial}{\partial t} + U\frac{\partial}{\partial x} - \frac{1}{Re}\nabla^2 \right\} \nabla^2 v + \frac{\partial \Omega}{\partial y}\frac{\partial v}{\partial x} = \quad (3)$$

$$\epsilon \left\{ \frac{\partial}{\partial x}[(\vec{\omega}\cdot\nabla)w - (\vec{v}\cdot\nabla)\zeta] - \frac{\partial}{\partial z}[(\vec{\omega}\cdot\nabla)u - (\vec{v}\cdot\nabla)\xi] \right\}$$

$$\left\{ \frac{\partial}{\partial t} + U\frac{\partial}{\partial x} - \frac{1}{Re}\nabla^2 \right\} \eta - \Omega\frac{\partial v}{\partial z} = \epsilon\{(\vec{\omega}\cdot\nabla)v - (\vec{v}\cdot\nabla)\eta\}$$

When those equations represent a small ($\epsilon \to 0$) perturbation to some normally (y) varying mean flow, the nonlinear terms disappear, and one is left with a coupled system strictly for the normal velocity v and the normal vorticity $\eta = \partial u/\partial z - \partial w/\partial x$. Solving for those quantities, the streamwise and spanwise velocities (u,w) are recovered from the incompressibility condition and the definition of η.

While the general nonlinear equations do not uncouple from the other velocity or vorticity components, (v,η) are still regarded as the primary variables and the other velocity components are derivable from them. Similarly, applying control to v and η, by adding spatially distributed forcing functions, call them $f_v(x,y,z,t)$ and $f_\eta(x,y,z,t)$, to the right hand side of the Navier-Stokes equations, results in control of the remaining velocity components u and w. By controlling near-wall normal velocity and vorticity, the total near-wall velocity field is controlled.

Boundary layer control based on this formulation is general. It does not presuppose anything about either the natural dynamics of the boundary layer or the nature of the desired near-wall field. Existing drag reduction techniques are tied specifically to interfering with the phenomenology of bursting, either through generation of near-wall streamwise vorticity or by production of coherent oscillatory spanwise velocities. The present invention, however, has an actuation scheme that produces either of those velocity fields but is not limited to them. It should be realized that interference with the bursting process is not the only way to produce substantial drag reduction. In the present invention, for example, a 35% skin friction reduction is achieved, with forcing confined to a region of thickness $6.2\nu/u_\tau$ normal to the surface, using a control scheme based on stabilizing two-dimensional nonlinear neutral modes, a scheme that is completely unrelated to the bursting process.

The joint control of normal velocity and vorticity by the present invention is a general scheme for boundary layer control that can be used to achieve effects in addition to drag reduction, such as separation control, which may not be accessible through existing drag reduction schemes. The fact that the actuator of the present invention controls normal vorticity, a quantity usually unmentioned in phenomenological explanations of boundary layer dynamics, is not a barrier. Any practical control scheme is likely to calculate the desired control velocities (u,v,w) as local functions of surface position. This is achieved by control circuitry 57 shown in FIGS. 1 and 5. The derivation of $\eta = \partial u/\partial z - \partial w/\partial x$ by that same circuitry is then a small matter, particularly since it is generally assumed that local intelligence provided by microprocessors will be part of control schemes needed to make any active drag reduction scheme work.

The maximum height above the actuators that a useful control velocity is produced is estimated by developing a relation between the two different length scales in the flow. The induced flow above actuator disks spinning at rate ω is characterized by the length scale $(\nu/\omega)^{1/2}$, while the turbulent flow above a wall scales as the wall unit $L^+ = \nu/u_\tau$. With the disk rotating at $2\omega\nu/u_\tau^2 = 0.2$ to create the necessary vorticity, a relation is obtained between the two scales as $(\nu/\omega)^{1/2} \sim \sqrt{10} \, L^+$. The circumferential velocity induced by the actuator falls to 20% of its surface value at $2-3(\nu/\omega)^{1/2}$. Taking that to be the physical limit of the controlled domain, the actuators' useful control range extends 5–6 wall units (5–6 $L^+$) into the flow.

Figure 6:
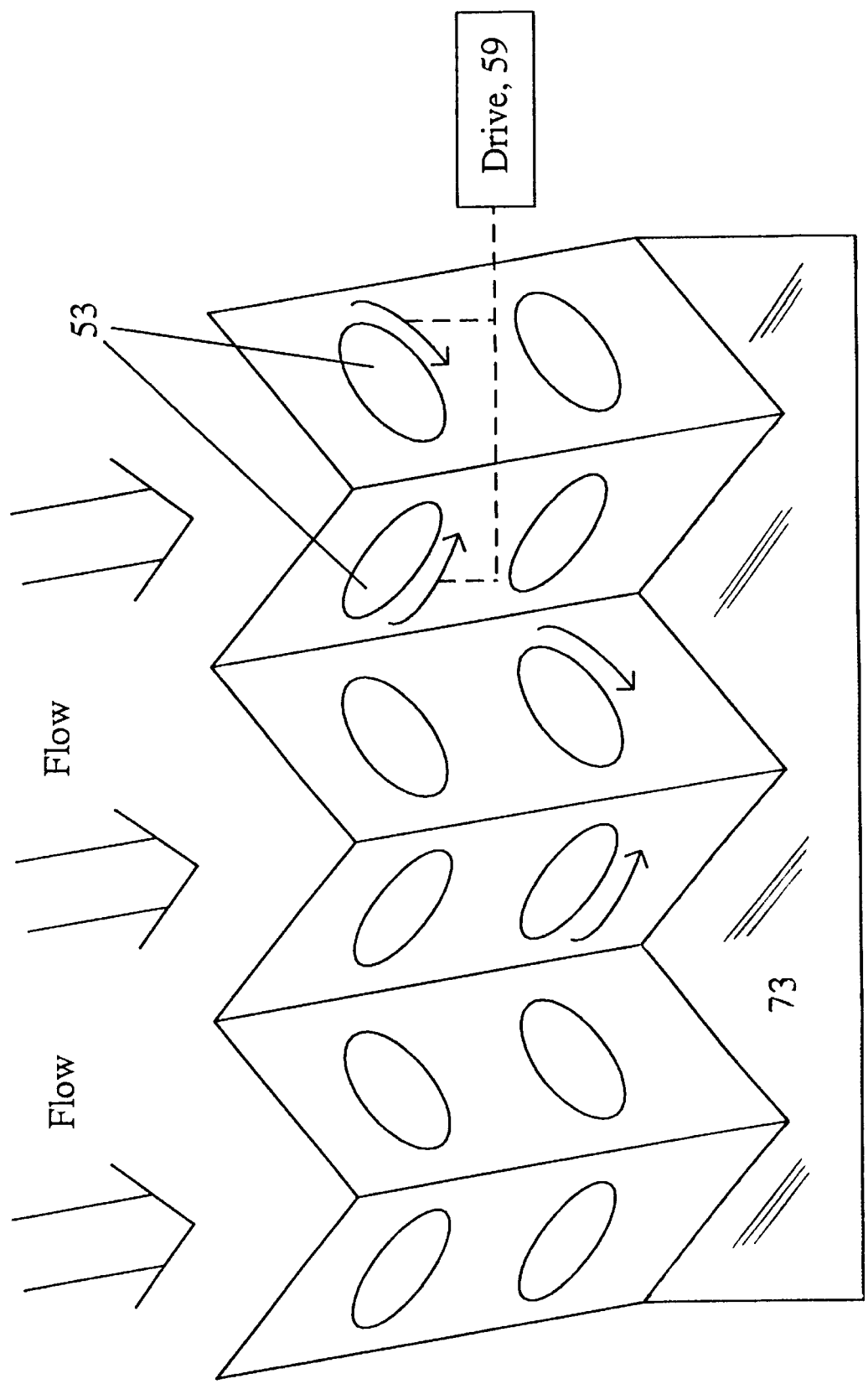
FIG. 6 shows the possible placement of the present invention on a riblet surface.

A further embodiment of the present invention is displayed in FIG. 6. In water, application of the Lorentz force by production of electric and magnetic fields at a surface strongly influences the velocity normal to that surface, and redistributes the vorticity in the boundary layer above it. This results in the creation of spanwise vortices that roll in the streamwise direction, thereby buffering the outer flow from the actual wall, and presenting the outer flow with an effective moving wall some distance above the surface. In one embodiment of the present invention, a similar kind of moving wall effect is produced in the surrounding air. The concept involves arraying a line of disk actuators 53 on the faces of a riblet surface 73, and intermittent operation (in unison) of pairs of those disks, facing each other across the riblet valleys, to spin up and reinvigorate blobs of fluid that roll along the riblet valley like marbles in a trough. Even though disks 53 have diameters no larger than the riblet face width, the vortical flow field they induce extends some distance into the air above the riblets, such that the outer flow is presented with a net streamwise velocity as an effective boundary condition. Drive 59 commands the rotation rate and intermittency period of disks 53 based on the value of the flow velocity above the boundary layer.

The theoretical basis for substantiating that opposed pairs of spinning disks can spin up the fluid between them to high velocities in short times is the Greenspan-Howard solution to the Navier-Stokes equations. In that theoretical result the spin up of fluid contained between two, coaxial disks is considered. The fundamental result for the time required to spin up the enclosed fluid to the disks' rotation rate is $$T = (D^2/\mu\Omega_i)^{1/2}$$

where D is the separation between the disks and $\Omega_i$ is the initial rigid body rotation rate of the fluid before the disks change their rotation rate. The mean shear at the wall, or effective wall in the riblet embodiments of the present invention, equals the surface value of the spanwise vorticity, $\Omega_z$, which in turn is twice the value of the local rotation rate of the fluid. Thus, $$(dU/dy)|_{wall} = \Omega_z = 2\Omega_i$$

However, since the friction velocity, $u_\tau$, is defined by $$(dU/dy)|_{wall} = u_\tau^2/\nu$$

we obtain $$I \sim \sqrt{2} \, D/u_{96}$$

If D is taken to be the order of the riblet spacing, say $20\text{--}40(\nu/u_\tau)$, an estimate of the spin-up time is $$T \sim 20\text{--}40(\nu/(u_\tau^2))$$

With typical values for $\nu$ ($\sim 10^{-5}$ m$^2$/sec) and $u_\tau$ ($\sim 1\text{--}10$ m/sec) one sees that spin-up should occur on the scale of 100 microseconds.

A number of factors affect that estimate, such as the nonparallel geometry of riblet faces, the finite diameter of the disks, and the confining effect of the riblet valley.

Figure 7:
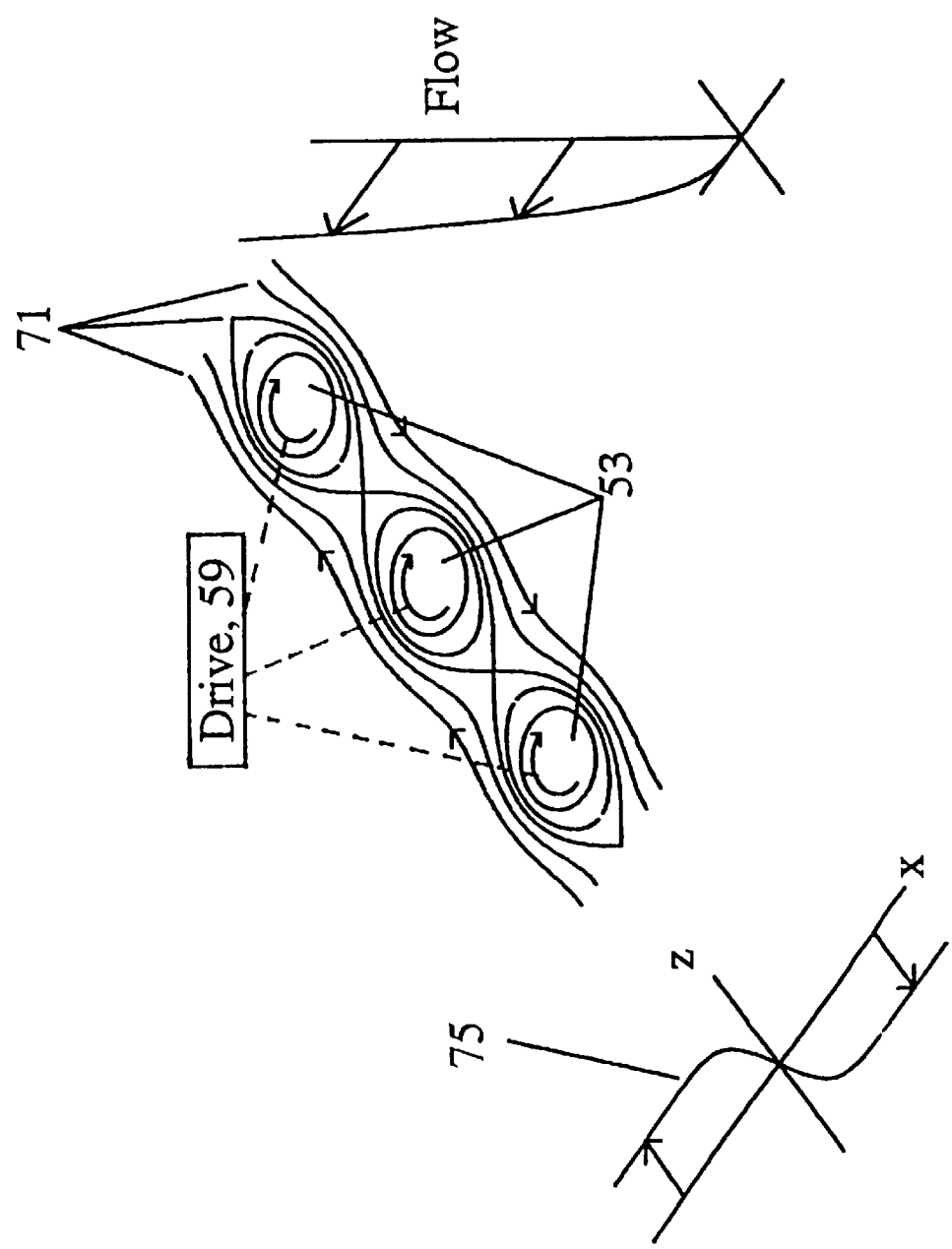
FIG. 7 shows an actuator-induced catseye flow field on the wall, transverse to the mean flow.

Yet another embodiment of the present invention is shown in FIG. 7. A line of disk actuators 53 rotate in unison to produce a surface flow with streamlines 71 as depicted. A surface velocity field 75 generated by disks 53 is parallel to the line of disks, and switches direction when crossing a line through the centers of the disks. A flow moving over the surface in a direction perpendicular to the line of disk actuators experiences a spanwise velocity at the wall that switches directions when crossing the line of disks. Placing another line of disk actuators, rotating in unison in the opposite direction, downstream of the first line, causes the flow to experience another change in spanwise velocity as it is crossed. Placement of additional lines of actuator disks downstream, each rotating opposite to the line just upstream, produces a surface velocity field in which spanwise velocity varies periodically in the streamwise direction.

Using numerical simulations of channel flow, it has been shown that imposition of a time-periodic spanwise pressure gradient, or periodic spanwise motion of the channel walls, results in substantial drag reductions. Those results are the periodic analog of the experimental observation of a lag between the shear stress vector and the mean velocity when the mean velocity undergoes an impulsive change of direction. It is understood from both the experiments and simulations that a flow subjected to a spanwise velocity oscillation at the wall has a good chance of encountering less drag than a flow where such oscillations are absent.

While it is difficult to generate a near-wall velocity field with an appropriate magnitude using mechanical devices, the use of spanwise lines of disk actuators makes such velocity field generation easy. The theoretical basis for that assertion is the "Kelvin's Catseye" solution of the inviscid equations of fluid flow, that represents the flow due to a line of point vortices of strength $\kappa = 4\pi$, spaced $a = 2\pi$ apart on the z-axis. Streamlines 71 of that solution $\psi = \ln(\cosh(x) + \cos(z))$ are shown in FIG. 7. Surface velocity profiles 75, W(x), through the line of vortices look like W(x)~tanh(x). A flow pattern similar to the catseye is created by a line of co-rotating disk actuators. In the nearwall region the oncoming mean flow sees a spanwise flow that switches direction at the line of disk-induced vortices. By locating another transverse line of disks rotating in the opposite sense some small distance downstream, the spanwise velocity near the wall can be made to switch signs again. That arrangement can be replicated any number of times downstream, each time reversing the disk rotation, and the shear flow will experience the periodic spanwise velocity perturbation that reduces the drag.

Since maximum drag reduction occurs for oscillations with period $100\nu/u_\tau^2$, and the characteristics of the catseye solution are known, the rotational rate and spacing, both spanwise and streamwise, of lines of disks that are needed for a particular result is easily determined. The basic relation for the streamwise spacing is that the lines should be spaced a distance $L_x$ apart, where $$L_x = (100\nu/u_\tau^2)U_{28}$$

For transonic cruise conditions (300 m/sec speed, 10 Km altitude), this works out to 8 mm. Determining the spanwise spacing of the disk actuators is more difficult, since the disks do not produce a point vortex, and the velocity field of a viscous vortex falls off more rapidly than its inviscid counterpart. However, if inviscid relations are used to obtain maximum allowable spacings, the relation between disk radius, $r_m$, rotational rate, $\omega$, and spanwise spacing, $a$, for a desired $0.8 \, U_\infty$ spanwise velocity is $$0.8 \, U_\infty = (\omega r_m^2)/4a$$

There are many tradeoffs possible with such interdependence.

Thus the reader will see that the disk actuators of this invention constitute a new nonintrusive mechanism and instrumentality for control of flows over surfaces, a mechanism that can be applied to drag reduction and separation control on aircraft and in pipelines to increase their energy efficiency. Furthermore, addition of suction and blowing apparatus to arrays of disk actuators yields a system capable of exerting general three-dimensional control of flows in the near-wall region. Such a system can operate to accomplish a more extensive set of flow control goals beyond drag reduction and separation control, such as enhanced mixing and surface heat transfer modification.

While the invention has been described with reference to specific embodiments, modifications and variations of the invention may be constructed without departing from the scope of the invention, which is defined in the following claims.

I claim:

1. An apparatus for actively controlling a boundary layer over a surface comprising at least one actuator at scales less than a local boundary layer thickness positioned in a surface, the at least one actuator having a stationary part and a rotating part, wherein the rotating part rotates in the plane of the surface, wherein the rotating part has an axis of rotation that is substantially perpendicular to the surface, and wherein the at least one actuator is either embedded in the surface, or may extend above or be depressed below the surface to the extent it remains hydraulically smooth.

2. The apparatus of claim 1, wherein the rotating part further comprises a circular disk or rotor.

3. The apparatus of claim 1, further comprising at least one jet positioned in the surface for controlling normal velocity in a boundary layer above the surface.

4. The apparatus of claim 3, wherein the at least one jet further comprises a blowing means and a suction means.

5. The apparatus of claim 1, wherein the at least one actuator is multiple arrays of actuators distributed over a surface underlying a boundary layer to be controlled.

6. The apparatus of claim 5, wherein the rotating part of each actuator further comprises a circular disk or rotor.

7. The apparatus of claim 6, wherein each disk has a diameter and spacing dependent upon situational requirements.

8. The apparatus of claim 6, wherein for drag reduction purposes the disk spacing should be less than 33 $v/u_\tau$, and the disk diameter should be as large a fraction of this value consistent with manufacturing ease.

9. The apparatus of claim 5, further comprising multiple holes positioned in the surface and interspersed among the arrays of actuators and jets positioned in the surface beneath the holes for providing blowing and suction.

10. The apparatus of claim 1, wherein the surface is a nonplanar, riblet surface.

11. An apparatus for actively controlling a boundary layer over a surface comprising at least one actuator positioned in a surface, the at least one actuator having a stationary part and a rotating part, wherein the rotating part rotates in the plane of the surface, wherein the rotating part has an axis of rotation that is substantially perpendicular to the surface, and wherein the at least one actuator is either embedded in the surface, or may extend above or be depressed below the surface to the extent it remains hydraulically smooth, and further comprising at least one sensor positioned in the surface for sensing flow generated at the surface and connected to control and drive means for adjusting rotation rates and cycles of the at least one actuator.

12. An apparatus for actively controlling a boundary layer over a surface comprising at least one actuator positioned in a surface, the at least one actuator having a stationary part and a rotating part, wherein the rotating part rotates in the plane of the surface, wherein the rotating part has an axis of rotation that is substantially perpendicular to the surface, and wherein the at least one actuator is either embedded in the surface, or may extend above or be depressed below the surface to the extent it remains hydraulically smooth, and wherein the at least one actuator is multiple arrays of actuators distributed over a surface underlying a boundary layer to be controlled, and further comprising multiple sensors positioned in the surface and connected by control and drive means to the actuators.

13. An apparatus for actively controlling a boundary layer over a surface comprising at least one actuator Positioned in a surface, the at least one actuator having a stationary part and a rotating part, wherein the rotating part rotates in the plane of the surface, wherein the rotating part has an axis of rotation that is substantially perpendicular to the surface, and wherein the at least one actuator is either embedded in the surface, or may extend above or be depressed below the surface to the extent it remains hydraulically smooth, an wherein the at least one actuator is multiple arrays of actuators distributed over a surface underlying a boundary layer to be controlled, and the arrays are lines of actuators rotating in unison and wherein the sense of rotation of a line of actuators is opposite to that of the lines of actuators on either side of it.

14. A method for actively controlling a boundary layer over a surface comprising the steps of embedding at least one actuator at scales less than a local boundary layer thickness having at least one rotor in a surface such that the actuator remains hydraulically smooth, rotating the at least one rotor and generating normal vorticity at the surface through the rotating of the at least one rotor.

15. The method of claim 14, further comprising positioning at least one jet proximate the at least one actuator and blowing air outward from the at least one jet at a direction substantially normal to the surface for adding a normal component of velocity to the normal vorticity generated by the rotating of the at least one rotor.

16. The method of claim 14, further comprising the step of controlling normal velocity at the surface.

17. The method of claim 16, wherein the controlling step further comprises blowing air outward at an angle substantially normal to the surface and suctioning air inward.

18. A method for actively controlling a boundary layer over a surface comprising the steps of embedding at least one actuator having at least one rotor in a surface such that the actuator remains hydraulically smooth, rotating the at least one rotor and generating normal vorticity at the surface through the rotating of the at least one rotor, and further comprising the steps of sensing the normal vorticity generated by the rotating of the at least one rotor, comparing a sensed vorticity with a desired vorticity value and adjusting rotation of the at least one rotor.

19. The method of claim 14, wherein the at least one actuator is multiple arrays of actuators embedded in the surface, wherein each actuator in the array has a rotor.

* * * * *

UNITED STATES PATENT AND TRADEMARK OFFICE
CERTIFICATE OF CORRECTION

PATENT NO. : 5,803,409
DATED : September 8, 1998
INVENTOR(S) : Laurence R. Keefe It is certified that error appears in the above-identified patent and that said Letters Patent is hereby corrected as shown below:

Column 2, line 2, after "10" insert --%--.

Column 9, line 38, change the formula to read:

$$T \sim \sqrt{2D}/u_\tau$$

Column 10, line 42, change the formula to read:

$$L_\chi = (100\nu/u_\tau^2)/U_\infty$$

Signed and Sealed this

Fifteenth Day of December, 1998

Attest:

BRUCE LEHMAN

*Attesting Officer*  *Commissioner of Patents and Trademarks*